April 22, 1958     R. A. HEARTZ     2,832,052
MAGNETIC PRODUCT MODULATOR
Filed Feb. 17, 1955
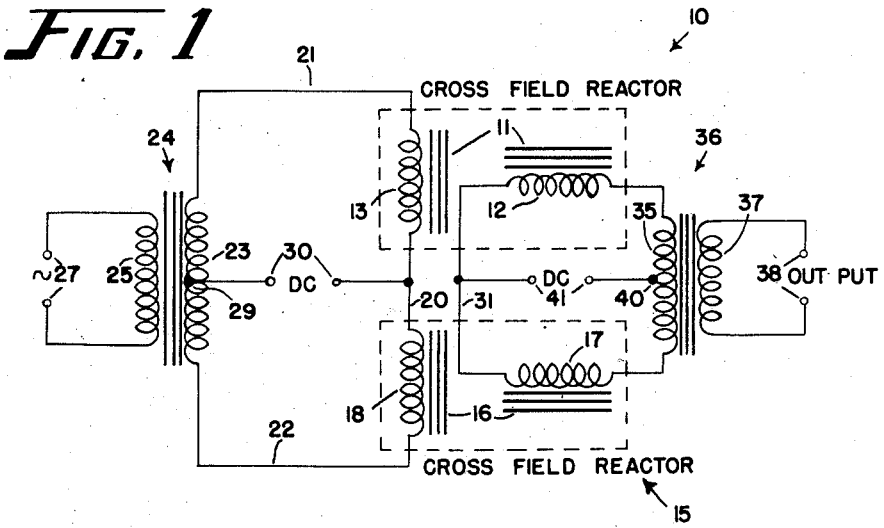
FIG. 1
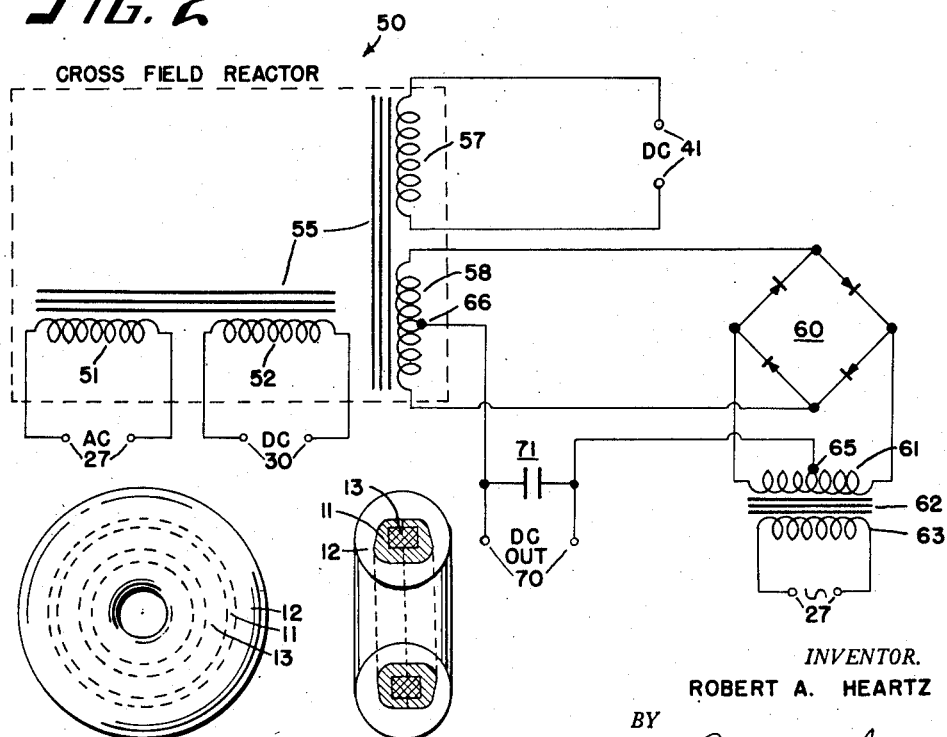
FIG. 2
FIG. 3     FIG. 4
*INVENTOR.*
ROBERT A. HEARTZ
BY Joseph E. Ryan
*ATTORNEY*

United States Patent Office 2,832,052
Patented Apr. 22, 1958

2,832,052

MAGNETIC PRODUCT MODULATOR

Robert A. Heartz, Minneapolis, Minn., assignor to Minneapolis-Honeywell Regulator Company, Minneapolis, Minn., a corporation of Delaware Application February 17, 1955, Serial No. 488,828

8 Claims. (Cl. 332—51)

My invention relates to a magnetic modulator and more particularly to an improved and simplified magnetic product modulator which utilizes the principle of superposed perpendicular magnetic fields and which provides a signal output proportional to the product of two of the signal sources producing the magnetic fields.

My improved magnetic product modulator is a modification and improvement of my cross-field magnetic modulator disclosed in my application Serial No. 344,698, filed March 26, 1953, now abandoned. In the present invention, the output of the modulator is of fundamental frequency with respect to the A. C. excitation as distinguished from a second harmonic output in the former application and the magnetic modulator cores are so energized that the output signal is a product of two energizing signals and whose phase relationship to the modulating or carrier supply is determined by the similarity or dissimilarity of the exciting signal sources.

It is therefore an object of this invention to provide a simplified and improved magnetic product modulator.

It is also an object of this invention to provide a magnetic device capable of producing an output proportional to the product of two direct current signals energizing the same and producing this output as an A. C. signal modulated to an A. C. input to the device.

Still another object of this invention is to provide a magnetic product modulator whose signal output is proportional to the product of two signal sources and whose phase relationship to an exciting supply is determined by the similarity or dissimilarity of the signal sources connected thereto.

These and other objects of this invention will become apparent from a reading of the attached description together with the drawings wherein:

Figure 1 is a schematic circuit of one embodiment of this invention;

Figure 2 is a schematic circuit of a second embodiment of the invention; and

Figures 3 and 4 are plan and section views of a magnetic core with windings thereon as utilized in the subject invention.

My improved magnetic modulator which is schematically shown in Figure 1 in one embodiment utilizes a cross field type reactor employing a toroidal shaped core with an annular or circumferential winding thereon and a toroidal or second winding thereon as best seen in Figures 3 and 4 which are included herein for explanation purposes and as described and claimed in my copending application referred to above. In Figure 1 the core with the windings thereon or the reactor are outlined in the dotted block to indicate that each is a single unit. Thus in Figure 1 10 is a first reactor including a winding 12 and a winding 13 mounted on a core 11, one of the windings being circumferentially positioned on the core or annular within the core and the second being toroidally wound on the core. Similarly the circuit includes a second reactor indicated generally at 15 as comprising a core 16, a winding 17 and a winding 18 one winding of which is annular or circumferential and the other which is toroidal with respect to the core structure. For the sake of explanation purposes, the windings 13 and 18 will be referred to hereinafter as the annular windings and the windings 12 and 17 will be referred to as the toroidal windings for the respective core structures or reactors 10 and 15. As will be later noted more fully, the positioning of the respective winding on the core whether annular or toroidal and its connection to external circuitry for the purpose of operation is generally immaterial and the positions of the windings may be interchanged, that is, the windings may be interchanged with respect to outside circuitry and energization without substantially effecting the operation of the device or departing from the scope of the invention. I have found, however, that it is generally easier and desirable to energize the annular winding with an alternating current supply or exciting source. It should also be noted in connection with this circuitry that core structures other than toroidal type may be employed in this invention, the main controlling factor being that there be no mutual coupling or inductance between the associated coils of each reactor.

The coils of reactors 10 and 15 in my product modulator are connected such that the annular coils 13 and 18 are serially connected by a conductor 20 and through conductors 21 and 22 to a secondary winding 23 of the transformer indicated generally at 24 having a primary winding 25 to which an alternating current exciting supply source 27 is connected. Secondary winding 23 has a tap as at 29 and a first D. C. signal source 30 is connected to the tap and the conductor 20 connecting the annular coils 13 and 18.

The toroidal coils 12 and 17 are similarly connected together in a series relationship through a conductor 31 and to a winding 35 of a transformer or coupling device indicated generally at 36 having a second winding 37 across which the output terminals of the apparatus indicated at 38 is connected or across which the output of the device is impressed. The winding 35 of the coupling device 36 is tapped as at 40 and a second D. C. or biasing source indicated at 41 is connected across the tap and the connection 31 connecting the coils 12 and 17 of reactors 10 and 15.

Thus it will be seen that the annular coils 13 and 18 have impressed thereon an alternating current signal or supply which will saturate the cores twice during each cycle of the supply frequency. Further the cores 13 and 18 will have a D. C. signal applied thereon to modify the energization of the core in the same direction as that produced by the alternating signal and a second D. C. signal applied to the toroidal coils which will be modified or modulated by the A. C. supply field with this signal coupled to the output terminals through the transformer 36. When the D. C. signal 30 is not present, the second D. C. signal 41 or bias is modulated by the A. C. supply and would produce a second harmonic output in each core. These second harmonic currents will be subtracted in the output transformer. When the D. C. signal 30 is applied it causes the A. C. supply signal in each core to traverse an unsymmetrical hysteresis loop which will cause the fundamental component to be generated in each output winding or toroidal winding 12 and 17 and while the second harmonic components will cancel in the output transformer, the fundamental and all odd harmonics will be summed producing an A. C. output which is principally the fundamental frequency and is proportional to the D. C. signal 30 and the D. C. signal 41. It will be recognized, however, that the output power is drawn from the signal source 41, and a certain power gain is realizable in the device of this type. However, the necessary air gap required and the low permeabilities of the core structure minimize its amplifying characteristics, but the devices do provide a modulated output which is proportional to the product of the two D. C. signals. The reversal of either D. C. signal will reverse the output phase of the output signal thus giving a polarity sensitive unit. With the polarities of the sources 30 and 41 alike, the output signal impressed on the winding 37 will bear a predetermined phase relation to the exciting source 27 and this phase relationship will be reversed when one or the other of the signals 30 and 41 changes in polarity.

A modification of the apparatus is shown in Figure 2 which utilizes a single reactor core with a plurality of windings wound annularly and toroidally thereon. In Figure 2, a reactor indicated at 50 has two coils 51 and 52 thereon which are for the purpose of this discussion described as the annular coils and so positioned with respect to the core indicated generally at 55. Also included on the reactor 50 are two coils 57 and 58 which will be referred to as toroidal coils. Connected to the coil 58 is a full-wave rectifier indicated at 60 which is also in turn connected to a secondary winding 61 of a transformer 62 having a primary winding 63 connected to the alternating exciting reference source 27. The secondary winding 61 is center tapped as at 65 as is also the toroidal winding 58 center tapped as at 66 and a pair of output terminals 70 of the modulator are connected respectively to the taps 65 and 66 with a filtering condenser 71 in parallel therewith. The annular windings 51 and 52 have connected respectively thereto the A. C. source or exciting source 27 and the D. C. signal source 30 while a toroidal winding 57 has connected thereto the second D. C. signal source 41 or the bias source. In this modification as in the embodiment of Figure 1, the alternating signal source 27 applied through the winding 51 saturates the core 55 on every half cycle, this magnetization being modified by the D. C. signal source 30. The power for the output of the device is supplied through the D. C. signal source 41 and the winding 57 to which is magnetically coupled the winding 58 to have the output signal induced therein. As indicated above, the output signal induced in the winding 58 will be the product of the signal sources 30 and 41, the power being supplied from the source 41. The signal induced in the winding 58 is of the alternating current type and this signal is fed through the full-wave rectifier and transformer to which the alternating signal is also connected to provide a D. C. output of the full-wave type across the taps 65 and 66. The A. C. signal induced in winding 58 is referenced against the A. C. reference signal 27 to determine the polarity of the D. C. signal or output supplied across the output terminals 70. As indicated above, the condenser 71 acts as a filter on this signal. In this embodiment, as was also indicated above, the position of the windings on the core, that is, their relationship to the core and to the external circuitry may be interchanged. Thus, for example the toroidal windings 57, 58 could be connected to the alternating supply and the first bias source and the annular windings 51, 52 to the output device and the second D. C. source. It should also be recognized that other types of core structures may be employed as long as there is substantially no mutual induction between the coils which are to be placed normal to one another. I have found it most feasible, however, to utilize the toroidal core structure as shown in my copending application to obtain the improved performance from the device.

In considering this invention it should be kept in mind that the present disclosure is intended to be illustrative only and that the scope of the invention should be determined only by the appended claims.

I claim as my invention:

1. In a magnetic product modulator a pair of toroidal core members, a coil on each core member wound circumferentially around said core, a second coil for each core member wound toroidally around said core, said circumferential coils being serially connected together, a transformer having a primary and secondary winding with the secondary winding connected in series with said circumferential coils and including a center tap, a first direct current source connected between said circumferential coils and the center tap of said secondary winding, an alternating current exciting source connected to the primary winding of said transformer, a second transformer member including a secondary winding and a center tapped primary winding, the toroidal wound coils of said core member being serially connected together and to the center tapped primary winding of said transformer, a second direct current source connected between the tap of said primary winding of said second transformer and to the connection between the toroidal coils of said core members, and output connections connected to the secondary winding of said second transformer and adapted to have an alternating voltage induced therein whose frequency is determined by the frequency of the exciting alternating current source and whose magnitude is proportional to the product of said first and second direct current sources.

2. A magnetic product modulator comprising, a pair of toroidal shaped cores, a first coil for each core member wound circumferentially on said core member and a second coil on each core member wound toroidally thereon, said circumferential coils being serially connected together and in series with an alternating current source of power, a first direct current source of power connected between said circumferential coils and said alternating current source, output circuit means for said modulator, the toroidal coils on said core members being serially connected together and to said output circuit means, a second direct current signal source connected between said output circuit means and said toroidal coils, the output circuit means being adapted to have an alternating current voltage produced therein whose magnitude is proportional to the product of said first and second direct current signal sources.

3. In a magnetic product modulator a pair of toroidal core members, a coil on each core member wound circumferentially around said core, a second coil for each core member wound toroidally around said core, said circumferential coils being serially connected together, a transformer having a primary and secondary winding with the secondary winding connected in series with said circumferential coils and including a center tap, a first direct current source connected between said circumferential coils and the center tap of said secondary winding, an alternating current exciting source connected to the primary winding of said transformer, a second transformer member including a secondary winding and a center tapped primary winding, the toroidal wound coils of said core member being serially connected together and to the center tapped primary winding of said transformer, a second direct current source connected between the tap of said primary winding of said second transformer and to the connection between the toroidal coils of said core members, and output connections connected to the secondary winding of said second transformer and adapted to have an alternating voltage induced therein whose frequency is determined by the frequency of the exciting alternating current source and whose magnitude is proportional to the product of said first and second direct current sources with the phase relative to said alternating current source the same as said alternating current source when the polarity of said first and second direct current signals are alike.

4. In a cross-field modulator, a toroidal shaped core, winding means mounted on said core and adapted to magnetize said core in a first direction, additional winding means mounted on said core normal to said first named winding means and adapted to magnetize said core in the direction normal to said first direction, an alternating current source and a first direct current signal connected to one of said winding means, a second direct current signal and output means connected to the other of said winding means, the output means having an output signal impressed thereon which is the product of the first and second direct current signals.

5. In a cross-field modulator, a continuous magnetic core, winding means mounted on said core and adapted to magnetize said core in a first direction, additional winding means mounted on said core normal to said first named winding means and adapted to magnetize said core in the direction normal to said first direction, an alternating current source and a first direct current signal connected to one of said winding means, a second direct current signal and output means connected to the other of said winding means, the output means having an output signal impressed thereon which is the product of the first and second direct current signals.

6. In a cross-field product modulator, a toroidal shaped core, first winding means wound circumferentially on said core and adapted to magnetize said core in a first direction, second winding means wound toroidally on said core and adapted to magnetize said core in the direction normal to said first direction, an alternating current source and a first direct current signal connected to one of said winding means, a second direct current signal and output means connected to the other of said winding means, the output means having an output signal impressed thereon which is the product of the first and second direct current signals.

7. In a cross-field product modulator, a toroidal shaped core structure of magnetic material, a first pair of windings wound on said core in a circumferential direction, a second pair of windings wound on said core structure toroidally and normal to said first set of windings, an alternating current source and a first direct current signal source connected to one of said pair of windings respectively, a second direct current signal source and an output means connected to the other of said pair of windings respectively, the output means having a signal impressed thereon which is the product of said first and second direct current signals.

8. In a cross-field product modulator, a toroidal shaped core structure of magnetic material, a first pair of windings wound on said core in a circumferential direction, a second pair of windings wound on said core structure toroidally and normal to said first set of windings, an alternating current source and a first direct current signal source connected to one of said pair of windings respectively, a second direct current signal source and an output means connected to the other of said pair of windings respectively, the output means having a signal impressed thereon which is the product of said first and second direct current signals and which is modulated at the frequency of said alternating current source, and phase detecting means included in said output means to derive a direct current signal output whose polarity varies with the similarity or dissimilarity of the polarities of the first and second direct current signals.

References Cited in the file of this patent
UNITED STATES PATENTS

| | | |
|---|---|---|
| 1,267,018 | Von Arco et al. | May 21, 1918 |
| 1,287,982 | Hartley | Dec. 17, 1918 |